(12) United States Patent  
Matsuzawa et al.

(10) Patent No.: US 7,819,592 B2
(45) Date of Patent: Oct. 26, 2010

(54) LENS CHANGEABLE DIGITAL CAMERA

(75) Inventors: Yoshinori Matsuzawa, Hachioji (JP); Kazuki Sakurai, Hachioji (JP)

(73) Assignee: Olympus Imaging Corp., Tokyo (JP)

( * ) Notice: Subject to any disclaimer, the term of this patent is extended or adjusted under 35 U.S.C. 154(b) by 659 days.

(21) Appl. No.: 11/649,317

(22) Filed: Jan. 3, 2007

(65) Prior Publication Data
US 2007/0166026 A1 Jul. 19, 2007

(30) Foreign Application Priority Data
Jan. 18, 2006 (JP) ............................. 2006-009451

(51) Int. Cl.
G03B 17/00 (2006.01)
(52) U.S. Cl. .................... 396/529; 396/354; 348/333.04
(58) Field of Classification Search ................. 396/529, 396/355, 357, 358, 186, 354; 348/333.04
See application file for complete search history.

(56) References Cited

U.S. PATENT DOCUMENTS

| | | | | |
|---|---|---|---|---|
| 3,762,295 | A * | 10/1973 | Kitai ........................... | 396/463 |
| 4,786,929 | A * | 11/1988 | Hamada et al. .............. | 396/283 |
| 5,023,650 | A * | 6/1991 | Hoshino et al. ............. | 396/213 |
| 5,130,729 | A * | 7/1992 | Sato et al. ...................... | 396/53 |
| D412,922 | S * | 8/1999 | Sekine ....................... | D16/134 |
| 6,085,048 | A * | 7/2000 | Mikoshiba et al. .......... | 396/374 |
| 6,130,717 | A * | 10/2000 | Arai et al. ................... | 348/360 |
| 6,130,994 | A * | 10/2000 | Maruyama ................... | 396/60 |
| 6,535,695 | B2 * | 3/2003 | Miyamoto ................... | 396/287 |
| 6,738,574 | B2 * | 5/2004 | Nishida et al. ................ | 396/87 |
| 2005/0238346 | A1 * | 10/2005 | Uematsu et al. ............. | 396/447 |

(Continued)

FOREIGN PATENT DOCUMENTS

JP 59-201029 11/1984

(Continued)

OTHER PUBLICATIONS

Machine Translation of JP2003-153050A.*

(Continued)

*Primary Examiner*—Melissa J Koval
*Assistant Examiner*—Linda B Smith
(74) *Attorney, Agent, or Firm*—Straub & Pokotylo; John C. Pokotylo

(57) ABSTRACT

A lens changeable digital camera has an imaging section, including an image sensor for capturing a subject image via the photographing lens, a display section capable of displaying image information and/or character information, a shielding section capable of being moved into and out of an imaging light path of the image sensor, a detection section for detecting an operation to remove the photographing lens, and a control section for, after the shielding section has been moved out of the imaging light path, causing execution of an exposure operation for a specified period in the imaging section, and causing display of a moving image on the display section based on image data acquired by the exposure operation. When it is detected by the detection section that an operation to remove the photographing lens has been carried out, the control section control the shielding section to cause the shielding section to be moved into the imaging light path, and causes display of character or symbol data instead of the moving image display on the display section.

9 Claims, 14 Drawing Sheets

U.S. PATENT DOCUMENTS

2006/0263080 A1* 11/2006 Okumura .................... 396/374
2007/0153112 A1* 7/2007 Ueda et al. .................. 348/335

FOREIGN PATENT DOCUMENTS

| JP | 10-294888 | 4/1998 |
| JP | 2000-123454 | 4/2000 |
| JP | 2000-162494 | 6/2000 |
| JP | 2000-175100 | 6/2000 |
| JP | 2001-100308 | 4/2001 |
| JP | 2001-272593 | 10/2001 |
| JP | 2002-369042 | 12/2002 |
| JP | 2003-153050 | 5/2003 |

OTHER PUBLICATIONS

Chinese Office Action for Chinese Patent Application No. 200710004215.0, mailed on Aug. 15, 2008 (8 pgs.) (with English Translation (15 pgs.)).

* cited by examiner

LENS CHANGEABLE DIGITAL CAMERA

Benefit is claimed, under 35 U.S.C. §119, to the filing date of prior Japanese Patent Application No. 2006-9451, filed on Jan. 18, 2006. This application is expressly incorporated herein by reference. The scope of the present invention is not limited to any requirements of the specific embodiments described in the application.

BACKGROUND OF THE INVENTION

1. Field of the Invention

The present invention relates to a lens changeable digital camera having a live view display function, and in detail relates to a digital camera having a so-called Live View function (also called an Electronic Viewfinder Function) for displaying an image acquired by imaging elements as a moving image on a display unit.

2. Description of the Related Art

In conventional compact digital cameras, observation of a photographic subject was performed using an optical viewfinder, but recently it has become quite common to not have an optical viewfinder, and instead have a live view display function where output of imaging elements provided for storage photographic image data is displayed as a moving image on a display unit such as a liquid crystal monitor for observing the photographic image.

This type of live view display function, for example, is effective at the time of macro photography etc. as no parallax occurs, and for this reason there have been various proposals of examples of such a function provided in digital single lens reflex cameras. For example, Japanese patent laid-open No. 2002-369042 proposes a digital single lens reflex camera in which an optical viewfinder mode and an electronic viewfinder mode can be selected, and when the electronic viewfinder mode is selected together with a movable mirror being moved out of an exposure light path, a subject image is guided to the imaging element with the focal plane shutter in a completely open state, and in this way an acquired subject image is continuously displayed on a liquid crystal monitor.

SUMMARY OF THE INVENTION

The present invention has been conceived in view of the above situation, and has as an object to provide a digital single lens reflex camera capable of live view display with which it is difficult for dust to become attached to the surface of an imaging element.

With the digital camera of the present invention, screening members such as the shutter and movable mirror in front of the imaging element are retuned to a position covering the imaging element when the lens barrel is removed.

DETAILED DESCRIPTION OF THE PREFERRED EMBODIMENTS

Figure 1:
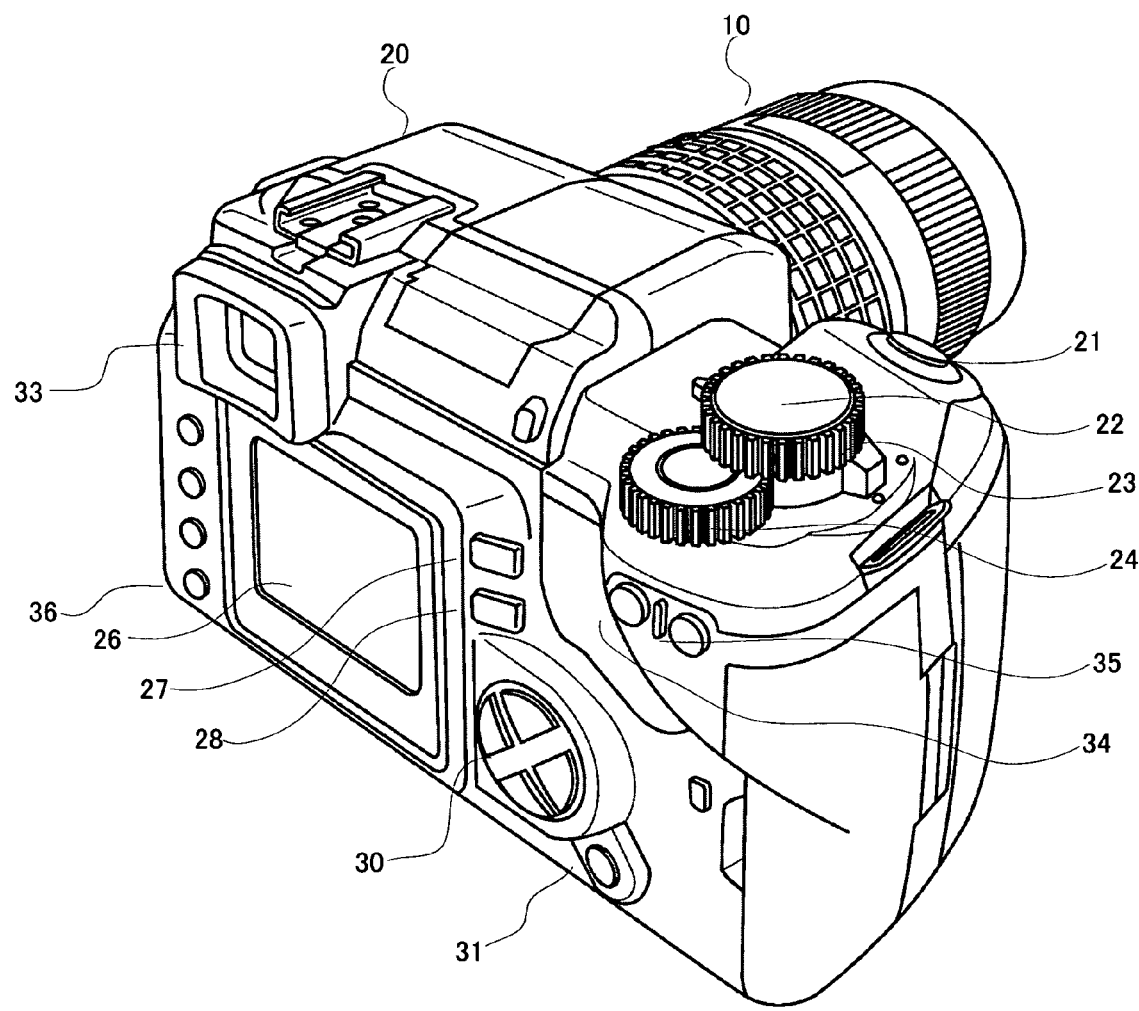
FIG. 1 is an external perspective view of a digital single lens reflex camera relating to an embodiment of the present invention.

A first embodiment of the present invention will be described in the following, with reference to the drawings. FIG. 1 is an external perspective view of a digital single lens reflex camera of the invention. This single lens reflex camera is comprised of a camera body 20 and a lens barrel 10 as an interchangeable lens. The lens barrel 10 is fitted to a mount section on the front surface of the camera body 20.

A release button 21, mode dial 22, power switch lever 23 and control dial 24 etc. are arranged on the upper surface of the camera body 20. The release button 21 has a first release switch that turns on if the photographer presses the button down halfway, and a second release switch that is turned on when the button is pressed down fully. If this first release switch (hereafter called 1R) is turned on, the camera carries out exposure preparation operations such as focal point detection, focusing of the photographing lens, and light measurements for the subject brightness, and when the second switch (hereafter called 2R) is turned on, an exposure operation is carried out to acquire image data for a subject image based on output of an image sensor.

The mode dial 22 is an operation member constructed to be rotatable, and by aligning a picture display (not shown) representing an exposure mode on the mode dial with an index it is possible to select an exposure mode such as program mode, aperture priority mode, shutter priority mode, portrait mode or auto mode. The power switch lever 23 is an operation member for turning a power supply of the digital single lens reflex camera on or off, and is constructed to be rotatable between two positions, and off position and an on position. The control dial 24 is an operation member for carrying out setting of exposure information, such as shutter speed, aperture value, sensitivity, compensation values etc., and it is possible to change various setting values by a rotation operation of the control dial 24.

A liquid crystal monitor 26, playback button 27, menu button 28, a cross key 30, OK button 31, viewfinder 33, live view switch button 34, display switch button 35, and preview button 36 are arranged on a rear surface of the camera body 20. The playback button 27 is an operation button for instructing display of stored images on the liquid crystal monitor 26 after exposure. Image data of subjects stored in a compressed mode such as JPEG, for example, in SDRAM 237 and a storage medium 245, that will be described later, is expanded. The cross key 30 is an operation member for instructing movement of a cursor in two direction, namely an X direction and a Y direction, on the liquid crystal monitor 26. The OK button 31 is an operation member for confirming various items selected by the cross key 30. The menu button 28 is a button for switching to menu mode, and if menu mode is selected by operation of this button 28 a menu screen is displayed on the liquid crystal monitor 26. The menu screen is comprised of a multiple hierarchical structure, with various items being selected using the cross key 30 and selection determined by operating the OK button 31.

The display switch button 35 is an operation member for switching to live view display for displaying subject images on the liquid crystal monitor 26 based on output of the image sensor. With the digital single lens camera of this embodiment, there are two types of preview display, namely A mode display and B mode display, and the live view switch button 34 is an operation button for switching between these two mode displays. The preview button 36 is an operation button for outputting an instruction to step down the photographing lens from a wide open (or maximum aperture) state in order to confirm depth of field when observing a subject image. The playback button 27, menu button 24, live view switch button 34, display switch button 35, and preview button 36 are all linked to an on/off switch, and signals generated in response to operation of the operating buttons are sent to an ASIC (Application Specific Integrated Circuit) 263, that will be described later. The liquid crystal monitor 26 is a display unit for live view display for observation of a subject image, playback display of a subject images that have already been taken, and display of camera information and menus. The monitor is not limited to a liquid crystal display as long as it is possible to perform these display operation. Although not shown in the drawings, the monitor is constructed such that it is possible to freely change the angle of display with respect to the camera body 20.

Figure 2:
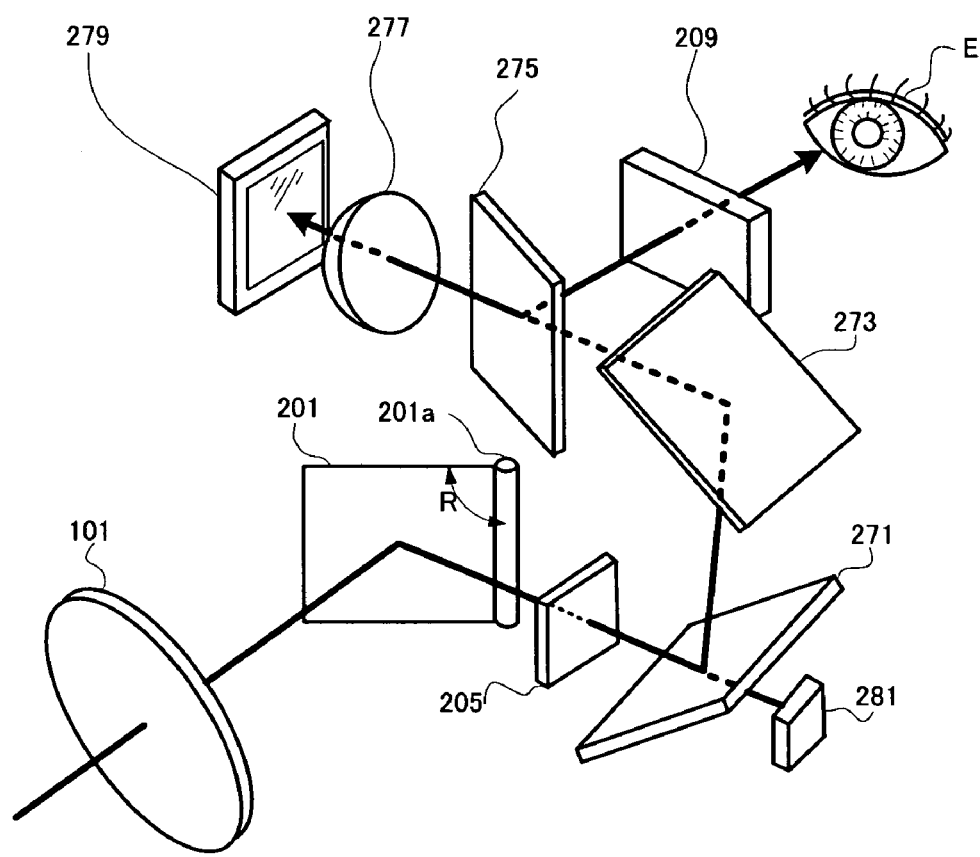
FIG. 2 is a block diagram showing the optical schematic structure of a digital single lens reflex camera relating to the embodiment.

FIG. 2 is a block diagram showing the optical schematic structure of a digital single lens reflex camera relating to the embodiment of the invention.

A first reflecting mirror 201 is arranged inside the camera body 20 on an optical axis of the photographing lens 101 arranged inside the lens barrel 10. This first reflecting mirror 201 can be rotated to a position at 45 degrees with respect to the optical axis of the photographing lens 101, in order to reflect luminous flux of the subject to the viewfinder optical system, and to a position where it is removed from the photographing light path, in order to guide a subject image to an image sensor (hereafter referred to as an image CCD (Charge coupled Device) 221). A rotational axis 201a of the first reflecting mirror 201 runs along the height direction of the camera body 20, and is capable of being rotated around following the arc R. Looking from the front surface of the camera body 20, the subject luminous light flux is totally reflected to the right by this first reflecting mirror 201. Within this embodiment, light is totally reflected to the right, but this is not limiting, and it is also possible to optimally select the reflection direction of the subject luminous light flux to be above the camera body, or to the left, depending on the arrangement of the structural members and optical members. Also, the movable mirror 201 is used as a light path changing member, but this is not limiting and it is also possible to use a member that alter a light path, such as a liquid crystal mirror than can be electrically switched between a light transmitting state and a light reflecting state.

A screen mat 205 is arranged on the reflected light axis of the first reflecting mirror 201, and a second reflecting mirror 271 constituted by a half mirror is arranged behind the screen mat 205. The screen mat 205 has a matte surface for forming subject light flux from the photographing lens 101 into an image, and is provided at a position between, and equidistant from, the first reflecting mirror 201 and the main CCD 221 (refer to FIG. 3). The second reflecting mirror 271 reflects some of the subject light flux upwards in the camera body 20, while the remaining subject light flux passes through the second reflecting mirror 271 and is incident on a photosensor 281 arranged behind the second reflecting mirror 271. The photosensor 281 is a divided photosensor arranged 7×7 for measuring subject brightness, and is connected to an input/output circuit 239 inside the ASIC 263.

Figure 3:
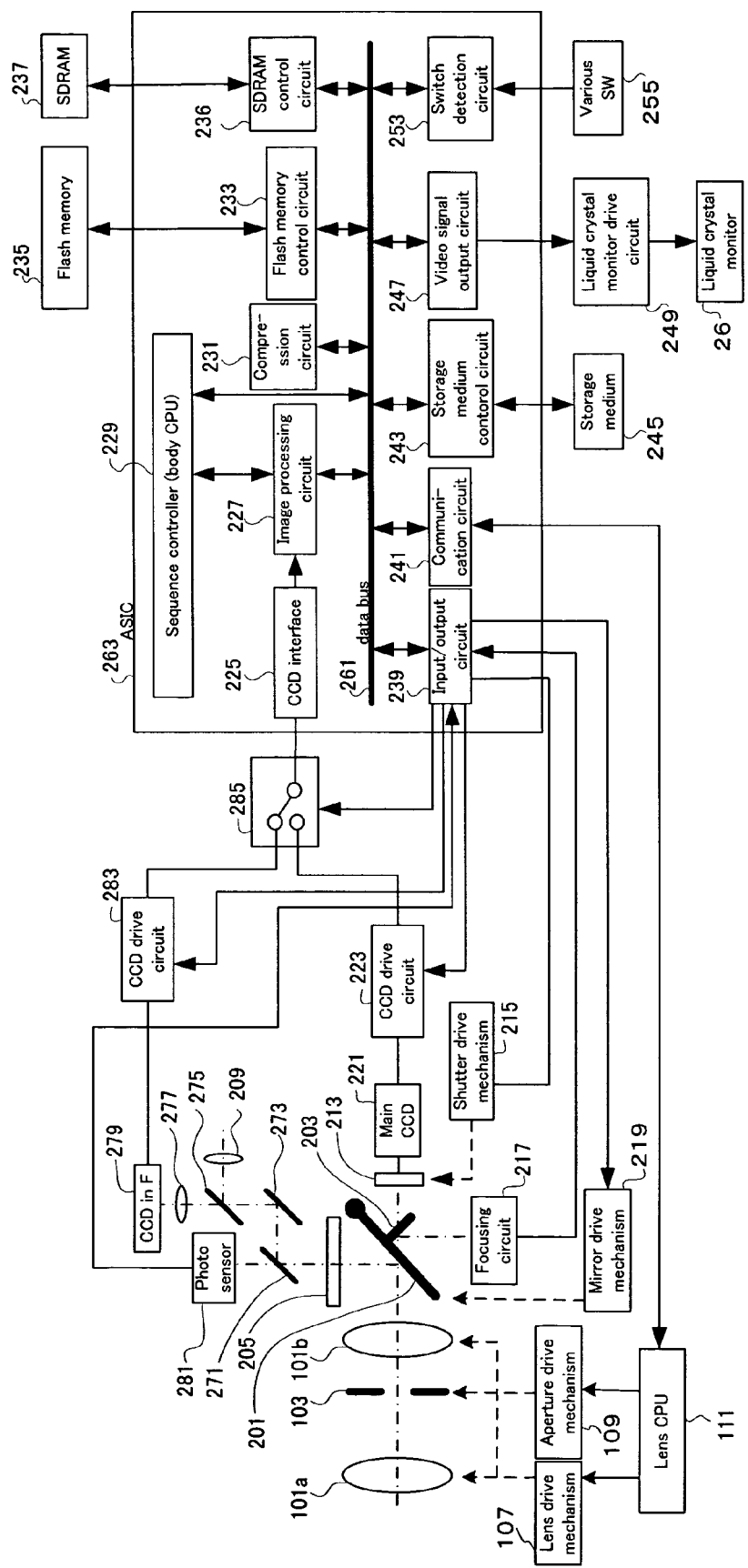
FIG. 3 is a block diagram showing the overall schematic structure of a digital single lens reflex camera relating to the embodiment.

A third reflecting mirror 273 is arranged on the reflected light axis of the second reflecting mirror 271, and subject light flux is completely reflected upwards and to the left of the camera body 20 by this third reflecting mirror 273. A fourth reflecting mirror 275 constituted by a half mirror is arranged on the reflected light axis of the third reflecting mirror 273. An imaging lens 277 and a CCD 279 inside the viewfinder, constituting a two dimensional image sensor, are arranged on the transmitted light axis of the fourth reflecting mirror 275. The CCD 279 inside the viewfinder converts a subject image formed on the screen mat 205 to photoelectric signals, and outputs these signals to a CCD drive circuit 283 (FIG. 3). Also, the fourth reflecting mirror 275 reflects remaining subject light flux to the rear of the camera body 20, and an eyepiece 209 is arranged on this reflected light axis. Subject light flux that has been reflected by fourth reflecting mirror passes through the eyepiece 209 and the viewfinder 33 (FIG. 1) and is observed as a subject image by the photographer E.

FIG. 3 is a block diagram showing the overall schematic structure of a digital single lens reflex camera relating to the embodiment. Imaging lenses 101a and 101b for focusing adjustment and focal length adjustment, and an aperture 103 for adjusting aperture, are arranged inside the lens barrel 10. The lens 101a and the lens 101b are driven by a lens drive mechanism 107, while the aperture 103 is driven by an aperture drive mechanism 109. The lens drive mechanism 107 and the aperture drive mechanism 109 are respectively connected to a lens CPU 111, and this lens CPU 111 is connected to the camera body 20 by means of a communication contact, not shown. The lens CPU 111 performs control inside of the lens barrel 10, controls the lens drive mechanism 107 to perform focusing and zoom operations, and controls an aperture value by controlling the aperture drive mechanism 109.

The previously mentioned first reflecting mirror 201 is arranged inside the camera body 20, the previously mentioned screen mat 205 for forming a subject image is arranged to the right of the first reflecting mirror 201 (in FIG. 3, it is above the first reflecting mirror 201 in the drawing), the second reflecting mirror 271, the third reflecting mirror 273 and the fourth reflecting mirror 275 are arranged behind the screen mat 205, with a photosensor 281 arranged behind the second reflecting mirror 271, and the imaging lens 277 and CCD 279 inside the viewfinder (in FIG. 3, denoted as CCD in F) arranged behind the fourth reflecting mirror 275. The eyepiece 209 is then arranged in the reflected light axis of the fourth reflecting mirror 275.

A half mirror is constructed close to the middle of the first reflecting mirror 201, and a sub-mirror 203 for reflecting the subject light flux that has passed through the half mirror section is provided on a rear surface of the first reflecting mirror 201. This sub mirror 203 is capable of rotation with respect to the first reflecting mirror 201, and when the first reflecting mirror 201 is removed from the photographing light path and subject light flux is incident on the main CCD 221, the sub mirror 203 rotates to a position covering the half mirror part, while when the first reflecting mirror 201 is in a subject image viewing position the sub-mirror 203 is at a position perpendicular to the first reflecting mirror 201, as shown in the drawing. This first reflecting mirror 201 is driven by a mirror drive mechanism 219. Also, a phase difference type focus detection circuit 217 including a rangefinder is arranged on the reflected light axis of the sub mirror 203, and this circuit detects deviations in focus of the subject image formed by the lenses 101a and 101b.

A focal plane type shutter 213 for exposure time control is arranged behind the first reflecting mirror 201, and drive control for this shutter 213 is performed by a shutter drive mechanism 215. The shutter 213 and/or the first reflecting mirror 201 can be stepped forward with respect to the photographing light path of the main CCD 221, as an image sensor, to function as a screen member. The main CCD 221 as a two-dimensional image sensor is arranged behind the shutter 213, and a subject image formed by the lenses 101a and 101b is photoelectrically converted into electrical signals. Within this embodiment, a CCD is used as the image sensor, but this is not limiting and it is also perfectly possible to use a two-dimensional imaging element such as CMOS (Complementary Metal Oxide Semiconductor).

The main CCD 221 is connected to the CCD drive circuit 223, and by the CCD drive circuit 223 performs analog to digital conversion (AD conversion). The CCD drive circuit 223 receives control signals from a sequence controller (hereafter referred to as a body CPU) 229 that will be described later, via the input/output circuit 239, and depending on the control signals, performs operations such as turning the power supply of the main CCD 221 on and off, instructing image timing of the main CCD 221, carrying out adjustment of deviations in output of the CCD 279 on the viewfinder, and amplifying (gain adjustment) the photoelectric conversion signals. Also, image signals are acquired by the CCD drive circuit 223 photoelectrically converting subject images from the main CCD 221 at a specified timing, for example, at a timing necessary to display an image at 30 fps (frames per second). The CCD drive circuit 283 that will be described later also has similar functions. The CCD 279 in the viewfinder is an image sensor for photoelectrically converting a subject image formed on the screen mat 205, and similarly to the CCD 221 can also be an image sensor such as CMOS, and since it is only used for viewing the subject image the number of pixels can be made smaller than that of the main CCD 221. The CCD 279 in the viewfinder is connected to the CCD drive circuit 283, and analog to digital conversion (AD conversion) is carried out by the CCD drive circuit 283.

The CCD drive circuit 223 and the CCD drive circuit 283 are connected to a CCD switching circuit 285, and this CCD switching circuit 285 performs control to selectively output one of the CCDs depending on a switching control line from the input output circuit 239. The CCD switching circuit 285 is connected to an image processing circuit 227 via the CCD interface 225. This image processing circuit 227 carries out various image processing, such as gamma (γ) correction, contrast correction, black & white/color mode processing etc. The image processing circuit 227 is connected to a data bus 261 inside the ASIC 263. Besides the image processing circuit 227, components such as a body CPU 229, compression circuit 231, flash memory control circuit 233, SDRAM (Synchronous Dynamic Random Access Memory) control circuit 236, input/output circuit 239, communication circuit 241, storage medium control circuit 243, video signal output circuit 247 and switch detection circuit 253 are connected to this data bus 261.

The body CPU 229 that is connected to the data bus 261 controls the operation of the digital single lens reflex camera of this embodiment. Also, the compression circuit 231 connected to the data bus 261 is a circuit for compressing image data stored in the SDRAM 237, described later, using JPEG etc. The image compression is not limited to JPEQ and it is also possible to apply other compression methods. The flash memory control circuit 233 connected to the data bus 261 is connected to a flash memory 235, and this flash memory 235 stores programs for controlling flow of the electronic camera, and the body CPU 229 performs control of the electronic camera in accordance with the programs stored in the flash memory 235. Incidentally, the flash memory 235 is an electrically rewritable non-volatile memory. The SDRAM 237 is connected via the SDRAM control circuit to the data bus 261, and this SDRAM 237 temporarily stores image information subjected to image processing by the image processing circuit 227 or image information compressed by the compression circuit 231.

The input/output circuit 239 connected to the above described shutter drive mechanism 215, focus detecting circuit 217, mirror drive mechanism 219, CCD drive circuit 223, photosensor 281, CCD drive circuit 283, and CCD switching circuit 285 controls input and output of data to and from each of the circuits such as those mentioned with the body CPU 229, via the data bus 261. The communication circuit 241 that is connected to the lens CPU 111 via the communication contact, not shown, is also connected to the data bus 261, and carries out communication such as data exchange with the body CPU 229 and control commands. The storage medium control circuit 243 connected to the data bus 261 is connected to the storage medium 245, and performs control of storage such as image data to this storage medium 245. The storage medium 245 is constructed with a rewritable storage medium such as xD picture card (registered trademark), compact Flash (registered trademark), SD memory card (registered trademark), memory stick (registered trademark) or hard disk drive (HD), and is removably inserted into the camera body 20.

The video signal output circuit 247 connected to the data bus 261 is connected to a liquid crystal monitor 26 via a liquid crystal monitor drive circuit 249. The video signal output section 247 converts image data stored in the SDRAM 237 or the storage medium 245 into video signals for display on the liquid crystal monitor 26. Based on this video signal, a moving image (live view image) acquired at a specified cycle by the main CCD 221 is displayed on the liquid crystal monitor 26. Also, when the live view display is not selected, display in the previously described information display mode M100 is made up of characters and symbols. The liquid crystal monitor 26 is arranged on the rear surface of the camera body 20 as shown in FIG. 1, but as long as it is in a position that can be seen by the photographer it is not limited to the rear surface, and also is not limited to liquid crystal and can be another display device. Various switches, including a switch for detecting a first stroke and second stroke of the release button 21, the mode dial 22, power switch lever 23, control dial 24, playback button 27, menu button 28, cross key 30, OK button 31, live view switch button 34, display switch button 35, preview button 36, lens detection switch 39, etc. (referred to as various SW in FIG. 3), are connected via a switch detection circuit 253 to the data bus 261.

Figure 16:
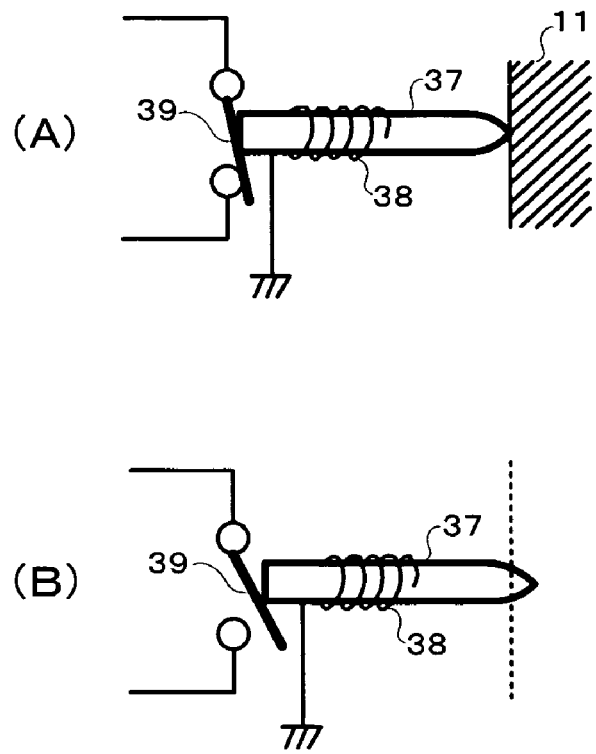
FIG. 16 is a block diagram showing the structure of a lens detection switch for detecting an attachment state of a lens barrel 10 with a camera body 20 of the embodiment, with FIG. 16A showing a state where a lens barrel is fitted to the camera body, and FIG. 16(B) showing a state where the lens barrel is removed from the camera body.

FIG. 16 is a block diagram shown the structure of the lens detection switch for detecting an attachment state of a lens barrel 10 to the camera body 20. A linkage pin 37 provided on a mount section for attaching the lens barrel 10 to the camera body 20 is urged in a direction to be pushed out from the camera body 20 by a compression spring 38. One end of the linkage pin 37 at the camera body side is connected to the lens detection switch 39, and this lens detection switch 39 is urged in an open direction. Reference numeral 11 is a lens side mount section of the lens barrel 10. Since the lens barrel detection section is constructed in this way, when the lens barrel 10 is attached to the camera body 20, as shown in FIG. 16(A) the linkage pin 37 is pressed in towards the left in the drawing by the lens side mount section 11, and the lens detection switch 39 is turned on. On the other hand, if the lens barrel 10 is removed from the camera body 10, then as shown in FIG. 16(B) the linkage pin 37 is projected outwards to the right in the drawing by the urging force of the compression spring 38, and the lens detection switch 39 is turned off.

Figure 4:
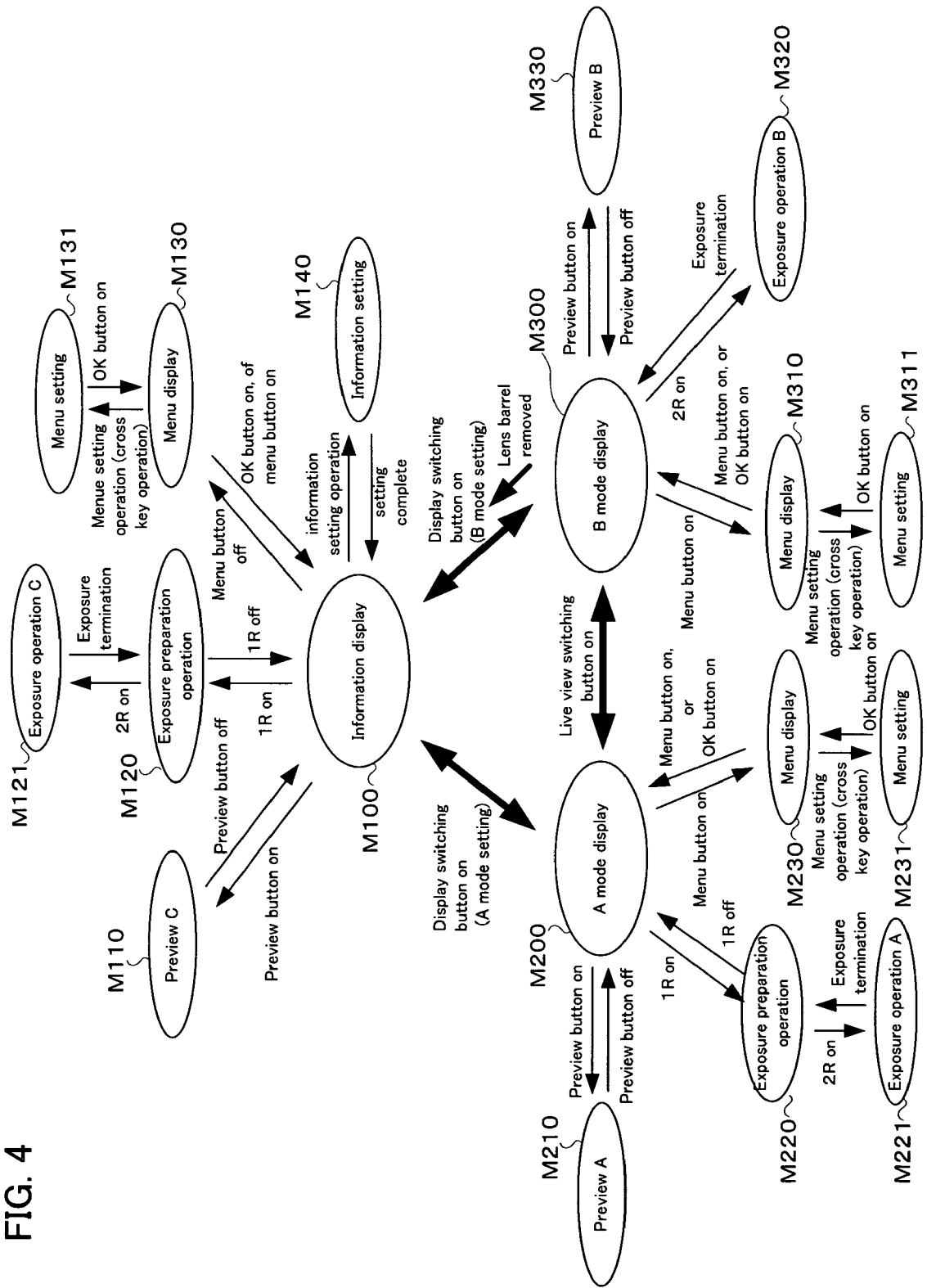
FIG. 4 is a block diagram showing the hierarchical structure of menus for display modes and operating modes of the digital single lens reflex camera relating to the embodiment.
Figure 15A:
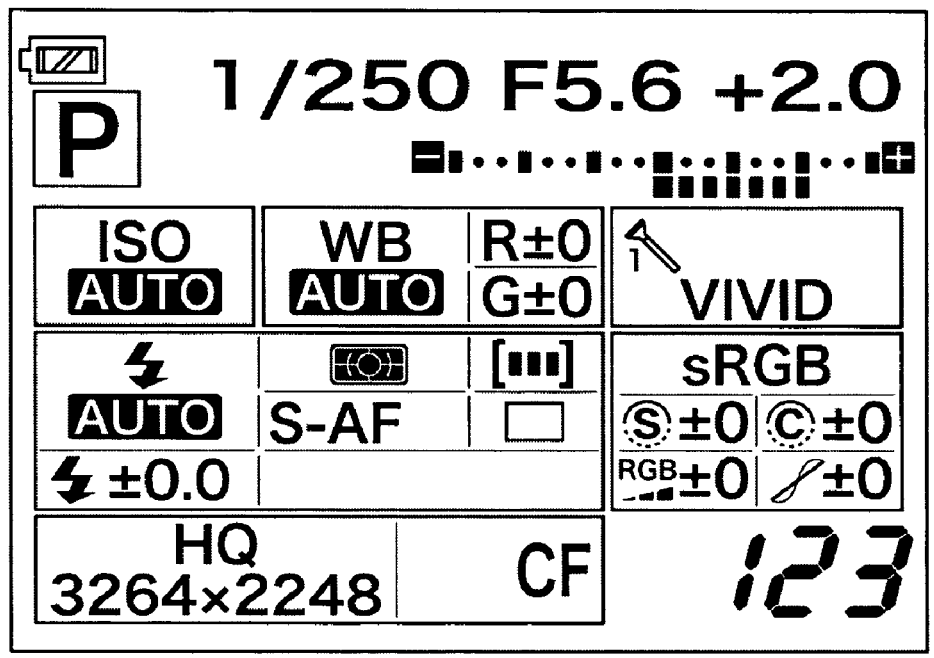
FIG. 15 is a display on a liquid crystal monitor of the embodiment, with FIG. 15(A) showing an information display screen and FIG. 15(B) showing a menu display screen.

Next, the hierarchical structure of the display and operating modes of the digital single lens reflex camera of this embodiment will be described using FIG. 4. There are three main display and operating modes, namely information display M100, A mode display M200, and B mode display M300. Information display M100 is initially set in a state where the camera body 20 is turned on. This information display mode is for carrying out display of basic information when photography with the camera, and displays information such as exposure mode, shutter speed, aperture, AF mode, flash, and number of pixels on the liquid crystal monitor 26, as shown in FIG. 15(A). Exposure modes such as program mode and shutter speed priority mode are set by a rotation operation of the mode dial 22. Also, items such as sensitivity, shutter speed, aperture value, compensation values, number of pixels are selected by selecting items on the information display screen by operation of the cross key 30, and numerical values are set by operating the control dial 24.

Figure 14:
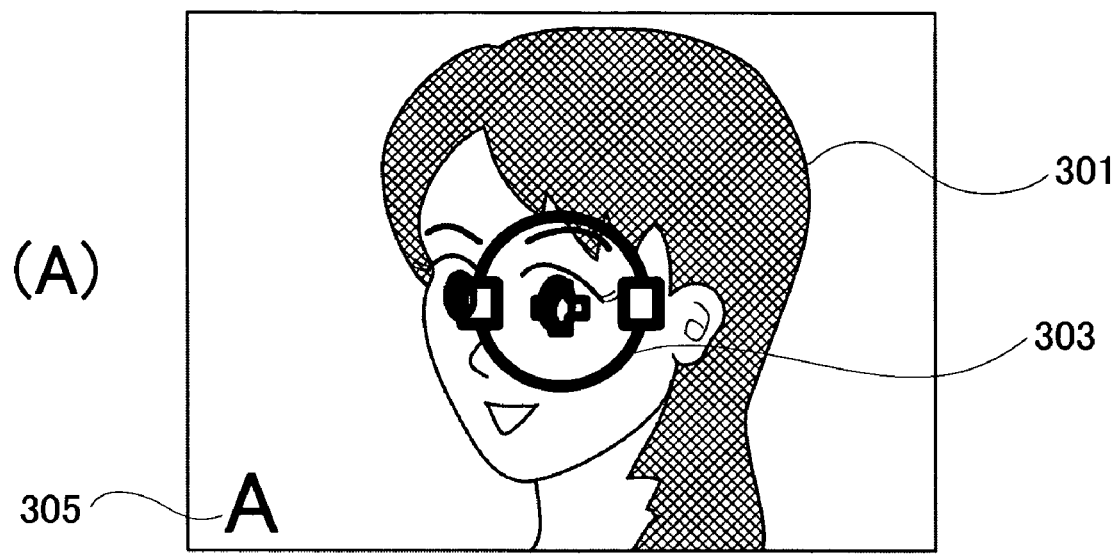
FIG. 14 is a display screen for preview display mode of a liquid crystal monitor of the embodiment, with FIG. 14(A) showing A mode display and FIG. 14(B) showing B mode display.
Figure 14:
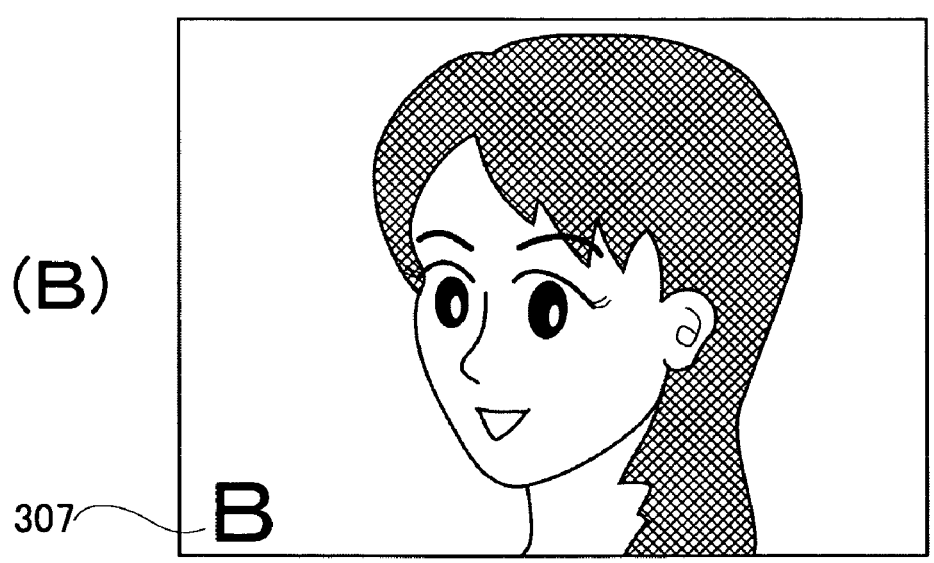

A mode display M200 is a mode for photoelectrically converting a subject image formed on the screen mat 205 using the CCD 279 in the viewfinder, and displaying a subject image for viewing on the liquid crystal monitor 26 based on the photoelectric conversion signals. With this mode, since subject light flux is guided to the focus detection circuit 217 via the sub mirror 203 provided on the first reflecting mirror 201, it is also possible to carry out automatic focus detection together with observation of the subject image. Screen display at the liquid crystal monitor 26 is display of "A" (refer to reference numeral 305) at the lower left of the screen, as shown in FIG. 14(A), to show that A mode display is in effect. In this mode it is also possible to observe an AF frame 303 imprinted on the screen mat 205.

B mode display M300 is a mode for taking the first reflecting mirror 201 out of the photographing light path, and opening the shutter 213 to form an image of the subject light flux on the main CCD 221, then converting this subject image to photoelectric conversion signals and displaying a subject image for observation on the liquid crystal monitor 26 based on these signals. In this mode, the half mirror inside the viewfinder optical system is not used, and subject light flux is received directly by the main CCD 221, which means that it is possible to prevent reduction in amount of light reaching the CCD 221, and it is also possible to sufficiently display the subject image for a low brightness subject. Automatic focus detection becomes impossible due to the first reflecting mirror 201 being removed, and manual focusing is carried out. "B" (refer to reference numeral 307) is displayed at the lower left of the liquid crystal monitor 26, as shown in FIG. 14(B), to show that B mode display is in effect. Also, with this mode focusing by the focus detection circuit 217 is not possible, so differing from A mode display the AF frame is not displayed. The reference characters for showing A mode display and B mode display are not limited to "A" and "B", and can be any symbol, character or pictograph such as "main CCD" or "Viewfinder CCD".

As previously described, when the camera body 20 is powered on, the information display M100 is initially set. Switching from this information display M100 to the A mode display M200 or the B mode display M300 is carried out by operating the display switching button 35. In this case, if the display switching button 35 is operated the most recently set A mode display M200 or B mode display M300 is switched to. At the time of shipping from the factory, if A mode display is set as the default value (obviously B mode display is also possible), then when the display switching button 35 is operated for the first time A mode display N200 is replaced, and if the display switching button 35 is operated again information display M100 is returned to. When set to A mode display M200, then B mode display M300 is switched to if the live view display switching button 34 is operated, and if the live view display switching button is operated once more in that state the A mode display M200 is returned to. If the display switching button 35 is operated in B mode display M300, information display M100 is returned to.

Specifically, switching from the information display M100 to the A mode display M200 or the B mode display M300 is configured such that by operating the display switching button 35, the most recently set mode is transferred to, and switching between the A mode display M200 and the B mode display M300 is carried out by operating the live view display switching button 34.

The fact that display has been set to A mode display M200 and B mode display M300 is stored in a non volatile memory, not shown, which means that even if the power supply of the camera body 20 is turned off the stored data is retained. However, it is also possible to reset to either A mode display or B mode display in response to power being turned on. As a special case, in the event that removal of the lens barrel 10 from the camera body 20 is detected by the lens detection switch 39, a switch is made from B mode display M300 to information display M100.

With this type of embodiment, switching between A mode display where light amount of the subject light flux is reduced, but automatic focus adjustment is possible, and B mode display where automatic focus adjustment is not possible but it is possible to sufficiently display a subject image even if amount of subject light flux is reduced giving a low brightness image, is possible with a simple operation.

Next, the lower hierarchy of the information display M100 will be described. In the information display M100 state, if the preview button 36 is pressed preview C is executed (M110) (refer to FIG. 9), and if the preview button 36 is released information display M100 is returned to. With the information display M100, if the release button 21 is pressed halfway (1R on) exposure preparation operations such as metering and focusing are carried out (M120), and if the release button 21 is then pressed all the way down (2R on)

output of the CCD 221 is readout, and an exposure operation C for storing image data for storage in the storage medium 245 is executed (M121).

Figure 15B:
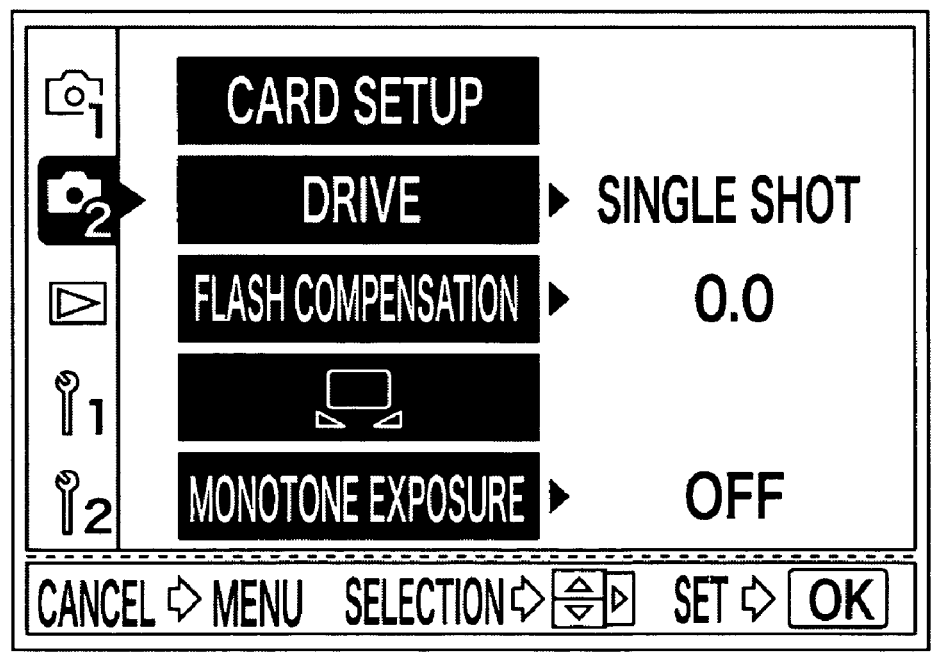

If exposure operation is completed and the halfway pressing of the release button 21 is released (1R off), information display M100 is returned to. Also, if the menu button 28 is turned on, a menu screen for setting card settings, drive mode, flash compensation etc. appears, as shown in FIG. 15(B) (M130). In this screen, by moving a cursor by operating the cross key 30, desired items are selected and can be set by pressing the OK button 31 (Ml31). If the menu button 28 or the OK button 31 are turned on from the menu display M130, it is possible to return to information display M100. Further, in the screen of the information display M100 (FIG. 15(A)), it is possible to operate the mode dial 22, control dial 24 and cross key 30 to set desired modes and values (M140).

Next, processing moves to the lower hierarchy of the A mode display M200, and first, if the preview button 36 is pressed the preview A is executed (M210). Preview A executes preview based on image signals from the main CCD 221, but the detail of this process will be described later using FIG. 7. If the preview button 36 is released, it is turned off, releasing preview mode and returning to A mode display M200.

In A mode display, if the release button 21 is pressed down halfway and 1R is on, exposure preparation similar to exposure preparation operation M120 is carried out (M220), and if the release button 21 is then pressed down fully and 2R is on, exposure operation A is carried out (M221). Also, if the menu button 28 is turned on, the menu screen shown in FIG. 15(B) appears (M230). In this state, items are selected by moving a cursor by operating the cross key 30, desired items are set using the OK button, and the menus display M230 is returned to (M231). With the menu button 28 or the OK button 31 on in this state, A mode display M200 is returned to.

Next, processing moves to the lower hierarchy of B mode display M300, and first, if the menu button is pressed in B mode display M300, the menu screen shown in FIG. 15(B) appears (M310). Here, if the cross key 30 is operated (M311) and desired items set using the OK button 31, the menu display M310 is returned to. It is possible to return from menu display to B mode display M300 by selecting (e.g., pressing) the menu button 28 or the OK button 31. In the B mode display state, even if the release button 21 is pressed halfway, the first reflecting mirror is in a removed state and the shutter is open, which means that no particularly operations are carried out, but if the release button 21 is pressed fully down and 2R is on, an exposure operation B is executed (M320) to store image data for storage in the storage medium 245 based on image signals from the main CCD. Also, if the preview button 36 is turned on, adjustment of the aperture 103 is carried out, and a preview B is executed (M330) to carry out preview display on the liquid crystal monitor 26 based on image signals from the main CCD 221.

Figure 5:
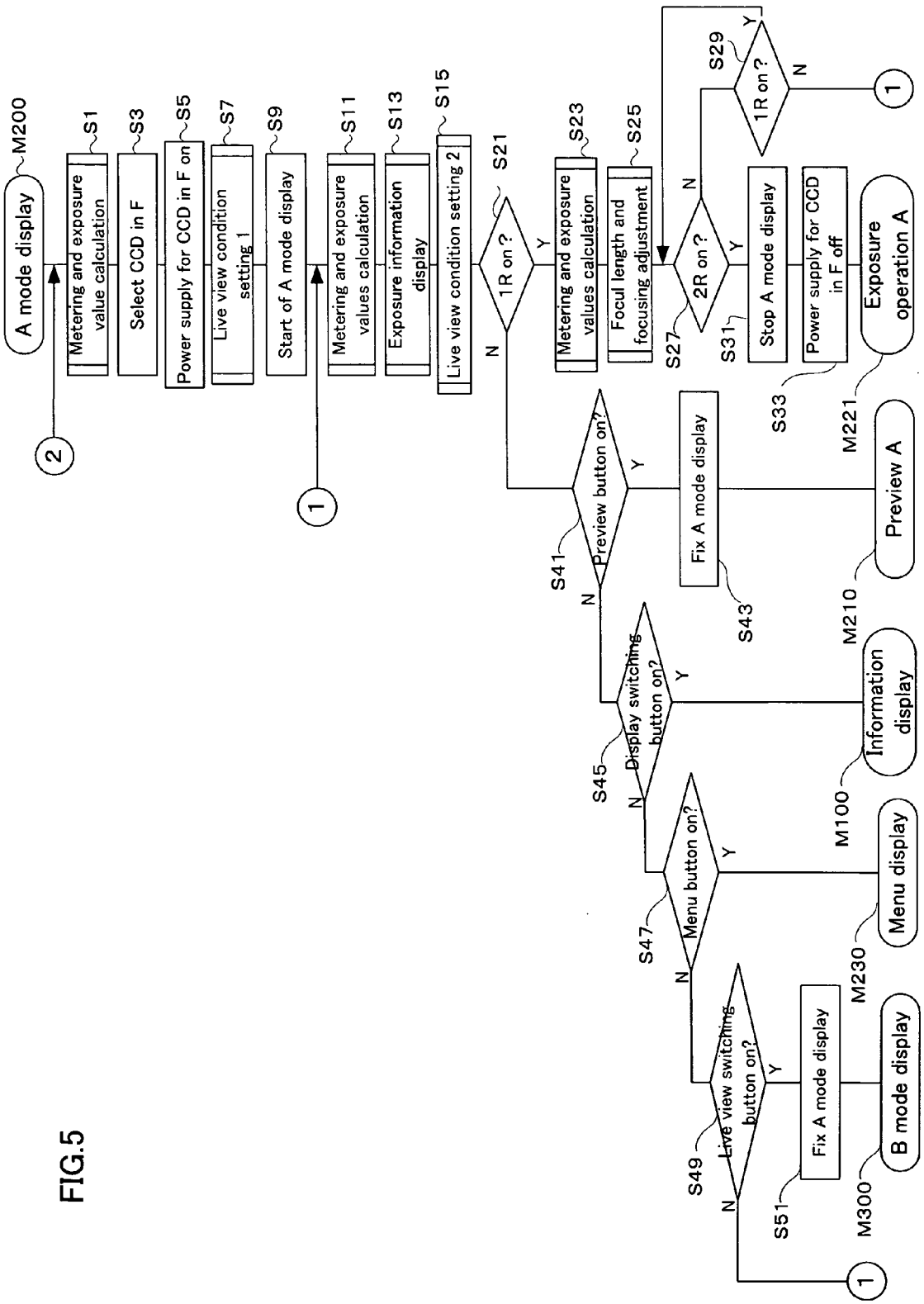
FIG. 5 is a flowchart showing A mode of the embodiment.

Next, details of the display and operation modes shown in FIG. 4 will be described using the flowcharts of FIG. 5 to FIG. 13. FIG. 5 is a flowchart of the A mode display M200 shown in FIG. 4. As previously described, if the display switching button 35 is turned on, A mode display operation is carried out to display a subject image based on output from the CCD 279 in the viewfinder. First, in order to determine operating conditions for the CCD 279 in the viewfinder, in step S1 metering and exposure value calculations (specifically, acquiring subject brightness values, shutter speed and sensitivity) are carried out based on output of the photosensor 281. Next, the CCD 279 in the viewfinder is selected (S3) and power is supplied to this CCD 279 (S5). Then, in order to carry out condition setting for electronic shutter speed and sensitivity for the CCD drive, a live view condition setting 1 subroutine (S7) is executed using the metering and exposure value calculation results obtained in step S1. By executing this subroutine it is possible to display an image on the liquid crystal monitor 26 at an appropriate brightness, and the details of this subroutine will be described later using FIG. 13. If the live view condition setting 1 is completed, A mode display commences (S9).

Next, metering and exposure value calculations are again carried out (S11) similar to step S1, and display of the calculated exposure values is carried out (S113). A live view condition setting 2 subroutine is then executed (S15) in order to appropriately maintain brightness of the live view display on the liquid crystal monitor 26. The live view condition setting 1 in step S7 is before A mode display on the liquid crystal monitor 26, and so is executed based on output of the photosensor 281, but with the live view condition setting 2, and electronic shutter speed and sensitivity at the time of the next exposure are determined from a difference in screen brightness based on target brightness and the previous exposure results. Here, brightness is a value dependent on a weighted average value for each pixel output of the CCD, for example. After that, it is determined whether or not the release button 21 has been pressed halfway, that is, whether or not 1R is on (S21).

If the determination result is that 1R is on, metering and exposure value calculation for use in exposure control at the time of taking a photograph are carried out (S23), and a subroutine for focal length and focusing adjustment is carried out (S25). The subroutine for focal length and focusing adjustment calculates deviations in focus of the photographing lens 101 based on the output of the focus detecting circuit 217, calculates lens drive amounts based on these focus deviation amounts, and drives the lens drive mechanism 107 by means of the lens CPU 111 to achieve focus. It is then determined whether or not the release button 21 has been pressed down fully, that is, whether or not 2R is on, and if it is off it is determined whether or not the release button 21 is still halfway down (S29) while if it is on, a standby state is entered where steps S27 and S29 are repeatedly executed. If the release button 21 is released by the photographer in this state, step S29 exits, and step S11 is returned to again. On the other hand, if the release button 21 is pressed down fully, processing advances to step S31, A mode display is stopped, namely execution of live view display on the liquid crystal display 26 is stopped, the power supply of the CCD 279 in the viewfinder is turned off (S33), and exposure operation A is transferred to (M221). Exposure operation A will be described later using FIG. 10.

Returning to step S21, in the event that 1R is off, it is determined in step S41 whether or not the preview button 36 is on. In the event that the preview button 36 is on, A mode display is fixed, that is update of the subject image for live view display being displayed on the liquid crystal monitor 26 is not carried out and the subject image is kept as it is (S43). This is because in the preview operation when the aperture 103 is stopped down and when subject image brightness is reduced, it is not possible to sufficiently comply with the live view condition settings, and image brightness is unnaturally altered. In order to prevent this unnatural variation, changing of the live view display is stopped until the image is stabilized. After that, there is a transfer to preview A (M210), but this will be described in detail later using FIG. 7.

Returning to step S41, in the event that the preview button 36 is off, processing advances to step S45 where it is determined whether or not the display switching button 35 has been pressed, namely whether or not it is on. In the event that the display switching button 35 is on, information display M100 described in FIG. 4 is returned to. If the display switching button 35 is off processing advances to step S47, and it is determined whether or not the menu button 28 has been pressed, namely whether or not the menu button is on, and if it is on, the menu display M230 described in FIG. 4 is advanced to. In the event that the menu button 28 is off, processing advances to step S49 where it is determined whether or not the live view switching button 34 is on (S49). In the event that the live view switching button 34 is off, a state exists where no buttons have been operated, and so processing returns to step S11 and the previously described process flow is repeated. In the A mode display M200 state, if the live view button 34 is operated, B mode display M300 is returned to, as described previously. In the event that ON is determined in S49, first of all, similar to step S43, fixing of the A mode display is carried out, and after that processing advances to B mode display (M300).

Figure 6:
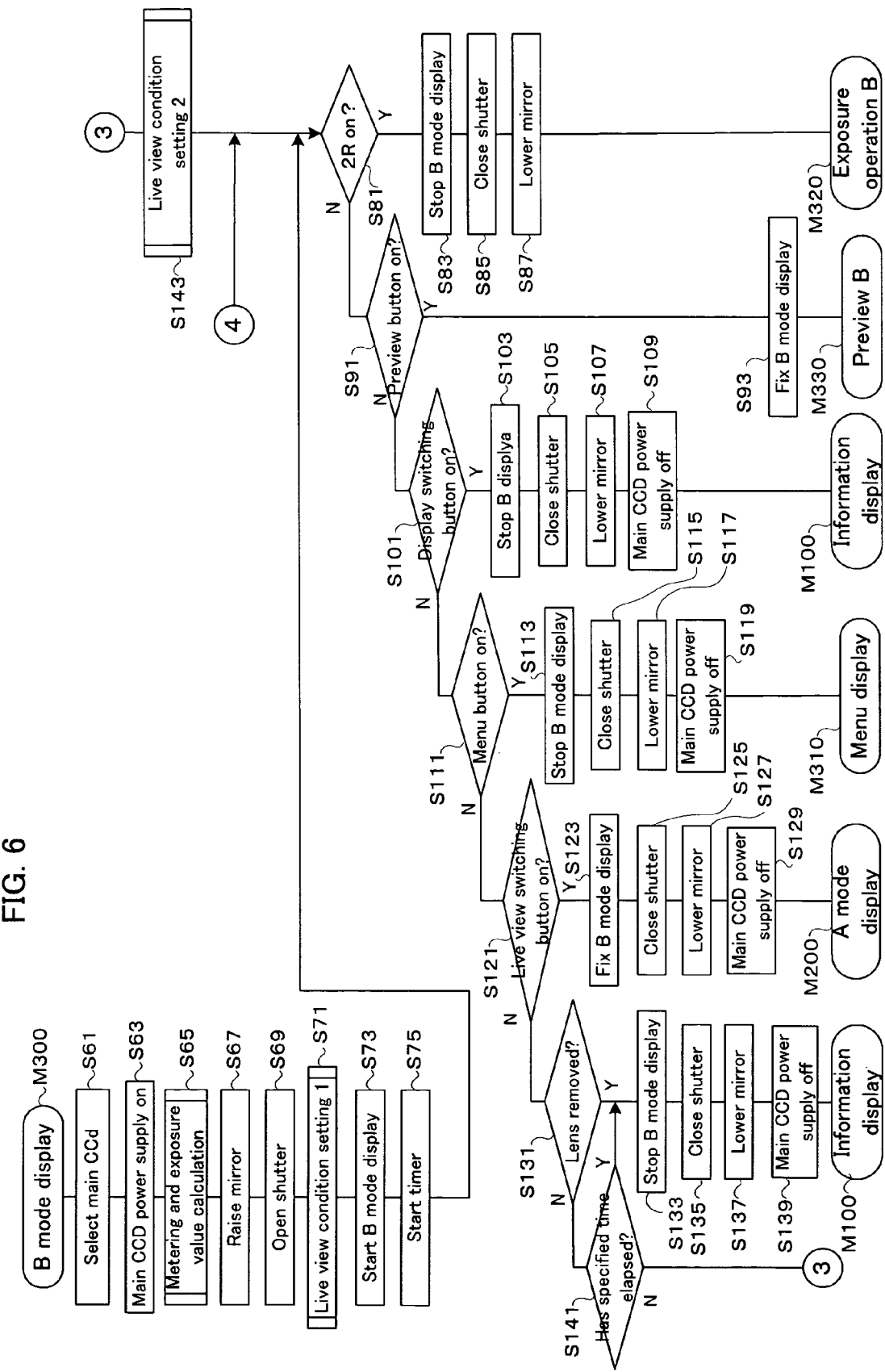
FIG. 6 is a flowchart showing B mode of the embodiment.

Next, flow of the B mode display will be described using FIG. 6. If B mode display is entered, the main CCD 221 is selected (S61) and supply of power to this main CCD 221 is commenced (S63). Next, similar to step S1, metering and calculation of exposure values is carried out (S65), and the first reflecting mirror 201 is rotated about the axis 201a and removed from the photographing light path (S67). Next, the focal plane shutter 213 is placed in an open state (S69) and a subject image is formed on the main CCD 221. Similar to step S7, a live view condition setting 1 subroutine is executed (S71), and live view display with the B mode display is commenced (S73). When there is a switch from A mode display M200 to B mode display M300, during the time from A mode display fixing in step S51 to commencement of B mode display in step S73, the display on the liquid crystal monitor 26 is fixed, but in step S73 there is a switch to B mode display in step S73, that is to live view display based on image signals output from the main CCD 221. Next, a timer is started and processing advances to step S81.

In step S81, it is determined if the release button 21 has been pressed down fully, that is, if 2R is on, and if it is on, processing advances to exposure operation. First of all, live view display being displayed on the liquid crystal monitor 26 is stopped, that is, B mode display is stopped (S83), and the focal plane shutter 213 and the first reflecting mirror 201 are returned to the initial states (S85, S87). After that, there is a transfer to exposure operation B (M320), but this will be described in detail later. Returning to step S81, in the event that 2R is off, processing advances to S91 and it is determined whether or not the preview button 36 is on. In the event that the preview button 36 is on, preview operation is entered, and the B mode display is fixed (S93). This is similar to the fixing of the A mode display in step S43, and is for preventing unnatural variation in image brightness when stopping down the lens. After that, there is a transfer to preview B (M330), but this will be described in detail later.

Returning to step S91, in the event that the preview button 36 is off, in step S101 it is determined whether or not the display switching button 35 is on. In the event that the preview button 36 is on, information display M100 is returned to, but before that processing for completing the B mode display is executed from S103 to S109. First, B mode display is stopped (S103), the focal plane shutter 213 is closed and the first reflecting mirror 201 is restored from the moved away position to a position where light flux of the viewfinder optical system is reflected (S107), and power supply to the main CCD 221 is turned off (S109). Once these operations are completed, there is a transfer to information display M100.

Returning to step S101, if the display switching button 35 is off, processing advances to step S111 where it is determined whether or not the menu button 28 is on. If it is determined that the menu button 28 is on, menu display M310 is carried out, but before that, processing for stopping the live view display in B mode display is carried out from steps S113 to S119. This processing is the same as for the previously described steps S103 to S109, and description will be omitted.

Returning to step S111, in the event that the menu button 28 is off, it is determined in step S121 whether or not the live view switching button 34 is on. If it is determined that the live view switching button 34 is on, there is a switch from B mode display M300 to A mode display M200, but before that occurs, switching processing is carried out from steps S123 to S129. First, fixing of the B mode display is carried out in step S123. This is in order to prevent disturbance to the image at the time of live view display mode switching. From step S125 to S129 is the same as for the previously described steps S105 to S109, and so description will be omitted.

Figure 17:
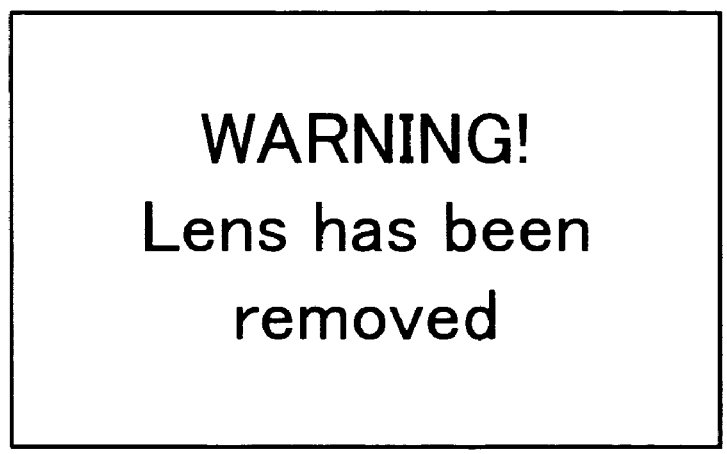
FIG. 17 is a display example for warning that a photographing lens has been removed during preview display, in the embodiment.

Returning to step S121, if the result of determination is that the live view display button 34 is off, processing advances to step S131, where it is determined whether or not the lens barrel 10 has been removed from the camera body 20, based on output of the lens detection switch 39. If the result of this determination is "yes", namely that the lens barrel 10 has been removed, information display M100 is carried out. With B mode display, the first reflecting mirror 201 is removed from the exposure light path, and the focal plane shutter 213 is placed in an open state. Therefore, the main CCD 221 is directly exposed to the outside and in an exposed state, and there is a potential problem of dust etc. becoming attached to the CCD. Therefore, by terminating B mode display M300, attachment of dust etc. to the imaging surface of the main CCD 221 is prevented. In order to terminate B mode display, processing from step S133 to S139 is carried out, but since these steps are the same as previously described steps S103 to S109, description will be omitted. In information display M100, it is also possible to display a warning to the effect that the lens has been removed while in live view mode on the liquid crystal monitor 26, as shown in FIG. 17. In this case, as well as the text warning shown in FIG. 17, it is also perfectly possible to give a warning using symbols or pictographs, etc.

Returning to step S131, if the result of determination is "no", the lens barrel 10 is still attached, processing advances to step S141, and in step S75 it is determined whether or not the value of a timer that has been started has exceeded a specified time. If it is determined that the specified time has not been exceeded, processing advances to step S143 wherein the live view condition setting 2 subroutine is executed, and then processing advances to previously described step S81. On the other hand, in the event that the specified time has elapsed, B mode display is terminated, and processing advances to step S133 in order to carry out information display M100. The reason that B mode display is terminated if the specified time has elapsed in this way is that if the B mode display continues for a long time the main CCD 221 will generate heat, and there is a potential problem of noise being generated in the output image.

As has been described above, with this embodiment disturbance to a subject image at the time of switching between A mode display and B mode display is prevented, and so the subject image is frozen on the monitor. That is, at the time of switching from A mode display to B mode display, the A mode display is frozen from steps S51 to step S73, and at the time of switching from B mode display to A mode display the B mode display is frozen from step S123 to step S9. As well as a method according to a specified operation, termination of freeze can also be carried out by appropriately selecting various methods such as, for example, freezing for a specified time until the image becomes stable. Also, with this embodiment, the display is frozen at the time of switching of both A mode display and B mode display, but it is also possible to apply freezing to only one or other of the display modes.

Further, if the fact that the lens barrel 10 has been removed is detected in B mode display, B mode display is stopped, and so a warning display to the photographer is output. Further, since the shutter and the movable mirror are driven so as to cover the image sensor, it is possible to prevent dust from becoming attached to the image sensor. Within this embodiment, both the first reflecting mirror 201 and the foal plane shutter 213 cover the main CCD 221, but dust etc. becoming attached will also be sufficiently prevented if only one of them covers the main CCD 221. The CCD 279 used with A mode display is inside the viewfinder, which means that there is hardly any potential problem of dust becoming attached, and therefore even if the lens barrel 10 is removed the A mode display continues. However, it is also possible to stop the A mode display when it is detected that the lens barrel 10 has been removed, and display the information display M100.

Figure 7:
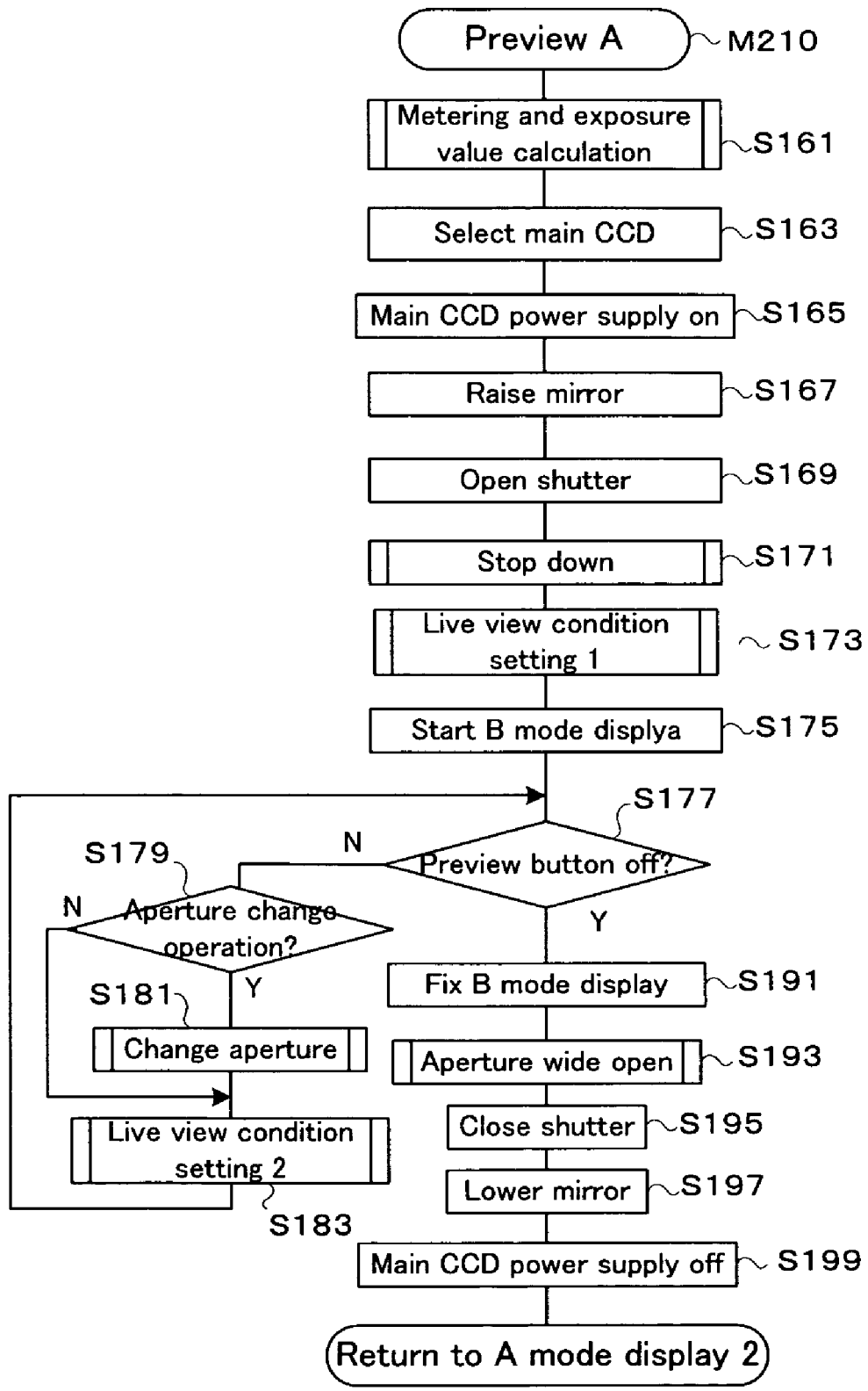
FIG. 7 is a flowchart showing preview mode A of the embodiment.

Next, preview A will be described using the flowchart of FIG. 7. Preview A is executed at the time of A mode display based on output from the CCD 279 in the viewfinder, but when preview A is executed preview display is carried out by switching to output of the main CCD 221. The reason for this is that in the case of A mode display there is a loss of light amount at the second reflecting mirror 271 constituting by a half mirror and the fourth reflecting mirror 275, and therefore if the stopping down operation is performed, the amount of light reaching the CCD 279 in the viewfinder will be significantly reduced resulting in an inferior image with increased noise. Therefore preview display is carried out based on output of the main CCD 221 that has little loss in light amount.

First, in step S161 metering and calculation of exposure amounts is carried out, similarly to step S1. The CCD 221 is then selected (S163), power is supplied to the main CCD 221 (S165), the first reflecting mirror 201 is rotated out of the exposure light path and the focal plane shutter 213 put in an open state (S169), and the aperture 103 is stopped down to a set or calculated aperture value (S171). After that, similarly to step S7, a live view condition setting 1 subroutine is executed (S173), and B mode display is commenced (S175). It is then possible to give preview display of the subject image based on output of the main CCD 221 on the liquid crystal monitor 26, and it is possible to confirm depth of field resulting with the stopped down state of the aperture 103.

Next, it is determined whether or not the preview button 36 has been released, that is, whether or not a switch linked to the preview button 36 is off. If it is determined that the button, or switch, is on, processing advances to step S179 where it is determined whether or not an aperture change operation has been carried out. This is because if the exposure mode is aperture priority or manual mode, it is possible that the aperture may be changed manually. If an aperture change operation has been carried out, a drive control operation (S181) of the aperture drive mechanism 109 is carried out so as to set the aperture to this changed aperture value. Also, if the aperture has been changed, the amount of subject light flux passing through the aperture will change, and so the amount of subject light flux reaching the main CCD 221 will also change. Therefore, in the live view condition setting 2 subroutine adjustment of the electronic shutter speed and sensitivity are carried out so as to keep the brightness of the liquid crystal monitor 26 constant (S183).

Returning to step S177, if it is determined that the switch linked to the preview button 36 is off, processing for returning to the normal A mode display is executed from step S191 to S199. First, B mode display is fixed (S191) so that no disturbance arises in the screen display displayed on the liquid crystal monitor 26 at the time of switching the display mode. After that, the aperture 103 is driven from its stopped down state to a fully open state (S193), and the focal plane shutter 213 is moved from the open state to the closed state (S195) Next, the first reflecting mirror 201 is rotated to a position where subject light flux is reflected to the viewfinder optical system, and power to the main CCD 221 is turned off (S199), and step S1 in the A mode display process flow is returned to.

Figure 8:
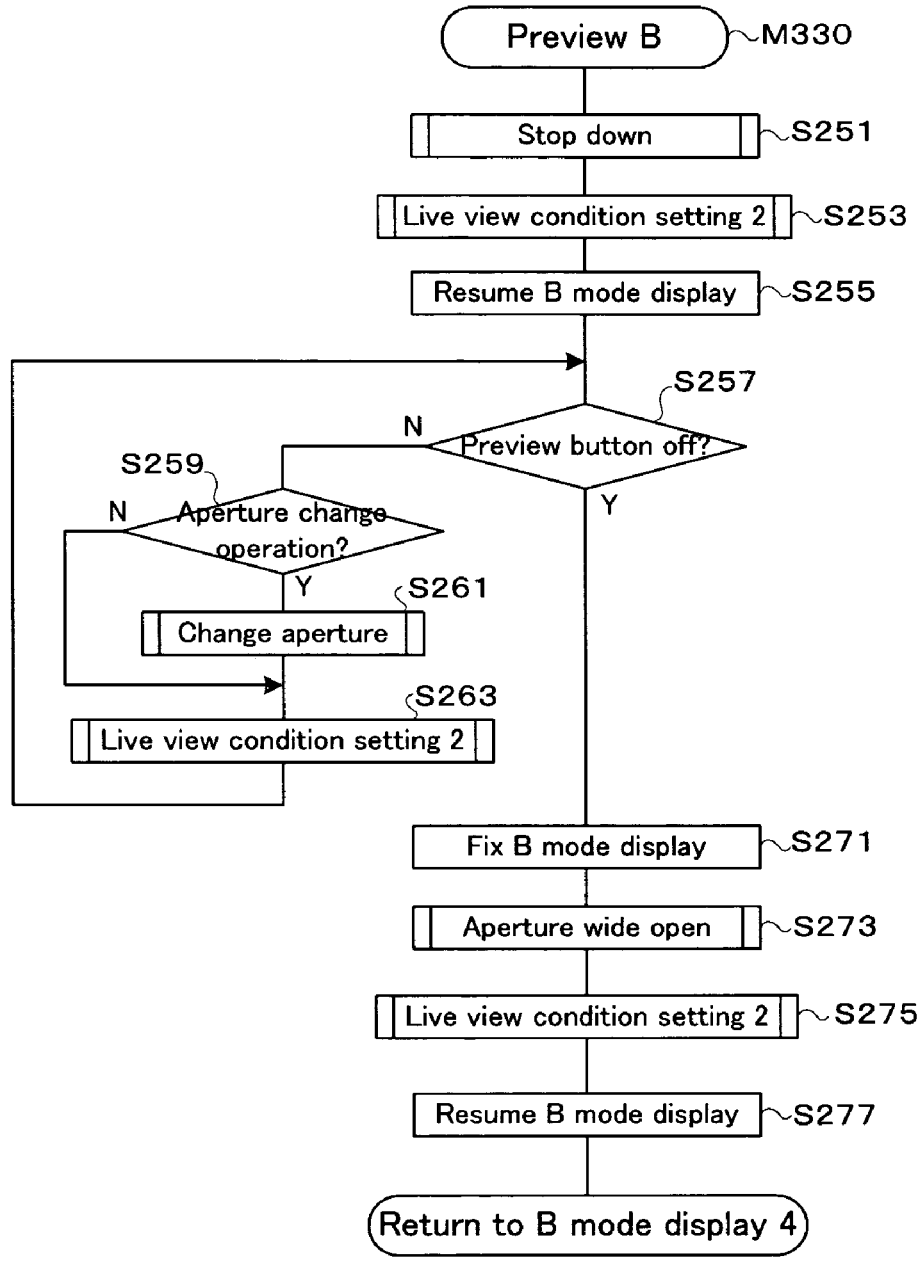
FIG. 8 is a flowchart showing preview mode B of the embodiment.

Next, preview B will be described using the flowchart of FIG. 8. This preview B, is the execution of the preview operation in B mode display M300, and corresponds to the operation M330 in FIG. 4 and FIG. 6. If preview B is entered while in B mode display the first reflecting mirror 201 is taken out of the exposure light path (S67) and the focal plane shutter 213 is in the open state (S69), and so the stopping down operation of the aperture 103 is carried out (S251). Then, similarly to step S15, a live view condition setting 2 subroutine is executed (S253), and B mode display is resumed (S255). B mode display, that is, live view display based on output of the main CCD 221, has been fixed in step S93, but in step S255 for terminating the stop down operations and terminating the display parameter setting for the liquid crystal monitor 26, the B mode display is resumed.

Next, it is determined whether or not the preview button 36 is off (S257), and if it is on display in preview mode is resumed, and an iris changing operations and live view condition setting are carried out in step S259 to S263, but since these steps are the same as in previously described step S179 to S183 detailed description is omitted. If the preview button 36 is off, processing from step S271 to S277 is performed to terminate preview mode in B mode display. First, in order to prevent unnatural variation in the brightness of an image on the liquid crystal monitor 26 at the time of mode restoration, live view display being shown in B mode display is fixed (S271), the aperture 103 is restored to the wide open state (S273), and the live view condition setting 2 subroutine is executed (S275). Since the live view display in B mode display is made stable, B mode display is resumed (S277). After that, B mode display is returned to a step S81 wherein this step S81 is re-executed. With preview A in A mode display, preview using B mode display was carried out, but because this preview B can ensure subject image light amount no particular steps have been taken to switch the display mode.

In the above described preview A and preview B, after entering the preview mode, during at least an aperture drive operation live view display is frozen, which means that it is possible to prevent unnatural variation in brightness of a subject image on the monitor. Termination of freeze can also be carried out by appropriately selecting various methods such as, for example, freezing for a specified time until the image brightness becomes stable. Also, with this embodiment, the live view display is frozen at the time of preview operation with both A mode display and B mode display, but it is also possible to apply freezing to only one or other of the modes.

Figure 9:
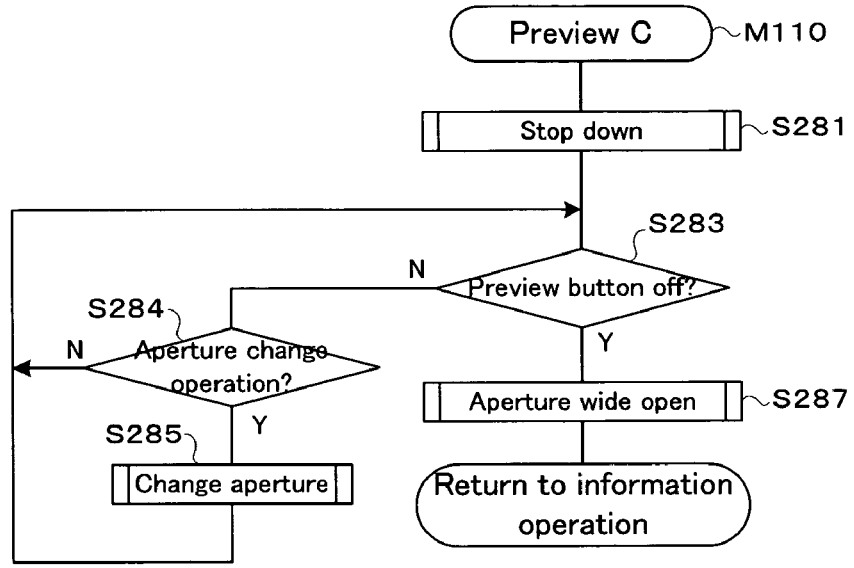
FIG. 9 is a flowchart showing preview mode C of the embodiment.

Next, preview C will be described using FIG. 9. This preview C is execution of the preview operation for information display M100, and corresponds to the operation in preview C M110 FIG. 4. With this preview C, there is no live view display on the liquid crystal monitor 26, and only information display is being carried out, which means that observation of a subject image is carried out through the eyepiece 209 and the viewfinder 33. While operating the camera body 20, stopping down of the aperture 103 in response to operation of the preview button 36 may be carried out. First, if the preview button 36 is on in the information display M100 state, the aperture 103 is stopped down (S281). Then, it is determined whether or not the preview button 36 may be off (S283), and if it is on it is then determined whether or not there has been an aperture change operation in step S284. If there has been an aperture change operation, drive control of the aperture drive mechanism 109 is carried out so as to achieve the changed aperture value (S285), and once the aperture change operation is completed processing returns to step S283. On the other hand, if the preview button 36 is off, the aperture 103 is put in the wide open state (S287) and then information display M100 is returned to.

Figure 10:
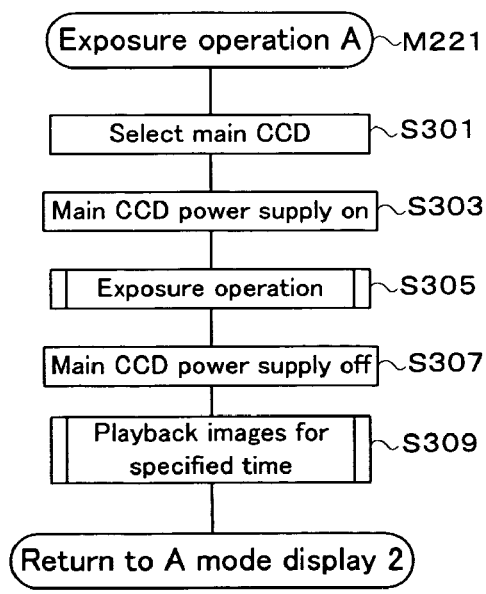
FIG. 10 is a flowchart showing exposure operation A of the embodiment.

Next, exposure operation A will be described using FIG. 10. Exposure mode A is an exposure operation for storing subject image data based on output of the main CCD 221 in the storage medium 245 when the release button 21 is pressed fully down, namely when 2R is on, on A mode display M200, and corresponds to the M221 operation of FIG. 4 and FIG. 5. First, the main CCD 221 is selected (S301), power supply of the main CCD 221 is turned on (S303), and an exposure operation subroutine is executed (S305).

With this exposure operation subroutine, together with removing the first reflecting mirror 201 from the exposure light path, operation of the focal plane shutter 213 is started, and photoelectric signals relating to a subject image formed on the main CCD 221 are read out. After respective processing has been carried out by the switching circuit 285, CCD interface circuit 225, image processing circuit 227, compression circuit 231, flash memory control circuit 233 and flash memory 235 etc. image information data is stored in the storage medium 245 via the storage medium control circuit 243. Once the exposure operation subroutine is completed, power supply of the main CCD 221 is turned off (S307), and a subject image stored in the storage medium 245 is stored for a specified time as a playback image (S309). If display of the playback image is completed, A mode display shown in FIG. 5 is returned to and the metering and exposure calculation of step S1 are carried out.

Figure 11:
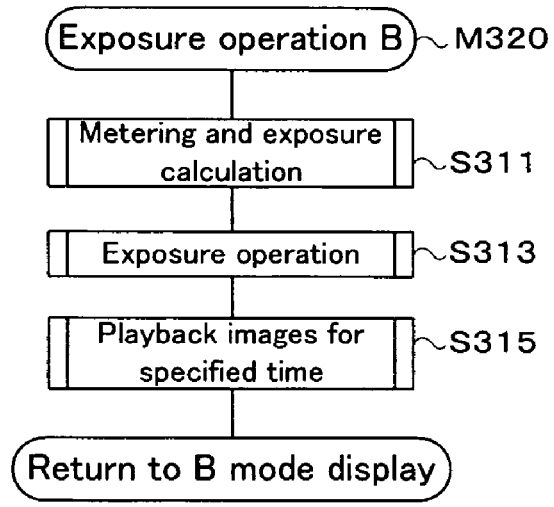
FIG. 11 is a flowchart showing exposure operation B of the embodiment.

Next, exposure operation B will be described using FIG. 11. Exposure mode B is an exposure operation for storing subject image data based on output of the main CCD 221 in the storage medium 245 when the release button 21 is pressed fully down, namely when 2R is on, in B mode display M300, and corresponds to the M320 operation of FIG. 4 and FIG. 6. In B mode display, the main CCD 221 is already selected because of live view display based on output from the main CCD 221, and the power supply is on, which means that the steps S301 and S303 of the exposure operation A are not required. However, because metering operations are carried out using the photosensor 281 during B mode display, in step S311 metering and exposure calculation are carried out. In order to perform metering, in step S87 the first reflecting mirror is rotated to a position reflecting subject light flux. Next, similarly to steps S305 and S307 of exposure operation A, the exposure operation subroutine and playback of a stored subject image for a specified period are executed (S313 and S315). Once display of the playback image is completed, B mode display shown in FIG. 6 is returned to.

Figure 12:
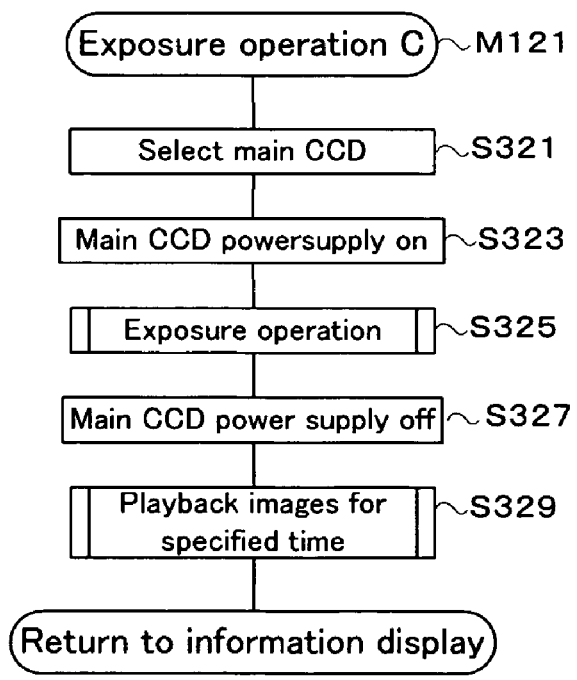
FIG. 12 is a flowchart showing exposure operation C of the embodiment.

Next, exposure operation C will be described using FIG. 12. Exposure mode C is an exposure operation for storing subject image data based on output of the main CCD 221 in the storage medium 245 when the release button 21 is pressed fully down, namely when 2R is on, in information display M100, and corresponds to the M121 operation of FIG. 4. Steps S321 to S329 of the exposure operation C are the same as steps S301 to S309 of exposure operation A, and so detailed description is omitted. Once each of these steps is completed, information display M100 shown in FIG. 4 is returned to.

Figure 13:
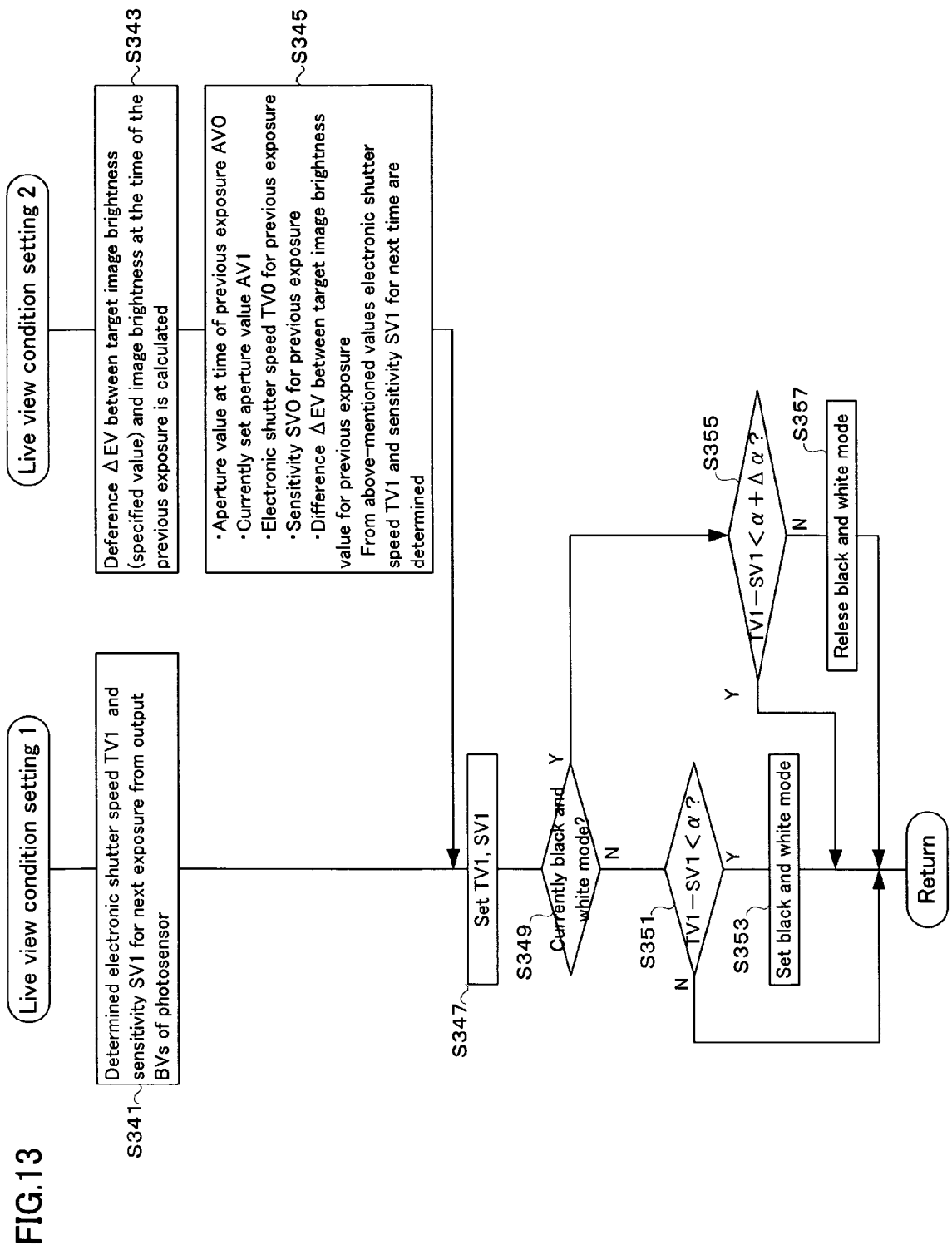
FIG. 13 is a flowchart for preview condition setting 1 and preview condition setting 2 of the embodiment.

Next, the "live view condition setting 1" and "live view condition setting 2" will be described using FIG. 13. As described previously, this subroutine is for carrying out adjustment of image brightness when displaying a subject image on the liquid crystal monitor 26. First, if the live view condition setting 1 subroutine is entered, in step S341 determination of electronic shutter speed TV1 and sensitivity SV1 for the next exposure is carried out based on output BVs of the photosensor 281. Since an aperture value at the time of live view display is wide open, if this aperture value is made AVs, then the following relationship holds:

$$AVs+TV1=BVs+SV1$$

and the following becomes true:

$$BVs-AVs=TV1-SV1$$

The left sides of these equations are already known values, and so it is possible to appropriately acquire TV1 and SV1 from the left side values in accordance with a program or a table. After that, the determined electronic shutter speed TV1 and sensitivity SV1 are stored and set in respective registers. The CCD drive circuit 223 and the CCD drive circuit 283 perform drive control of the CCDs 221 and 279 based on TV1 and SV1 stored and set here.

Following step S349, countermeasures for the case where subject light amount that has passed through the photographing lens 101 is reduced are carried out. When light amount received at the main CCD 221 or the CCD 279 inside the viewfinder is reduced, either the electronic shutter speed is slowed down or sensitivity (amplification factor) is increased in order to maintain the image of the liquid crystal monitor 26 at a constant brightness. However, increasing sensitivity increases noise, resulting in a rough image. In the event that subject light amount reaching the CCD is reduced, display is in a black and white mode which has a reduced information amount and is clear, while when light amount is high display is in color mode. In this case, if switching between black and white and color is given one threshold, then in the event that the subject light amount varies above and below this threshold black and white and color will change back and forth rapidly, resulting in a visually undesirable image. Therefore, the threshold for carrying out switching between black and white and color is given a hysteresis characteristic.

First, in step S349 it is determined whether or not the current display is black and white. Setting for color mode and black and white mode is performed by the image processing circuit 227, and so the determination here is carried out based on the mode set in the image processing circuit 227. If it is determined that the display is in color mode, processing advances to step S351, and it is determined whether or not TV1−SV1<α, namely, whether or not a difference between electronic shutter speed and sensitivity is smaller than a specified value (threshold) α. Here, the specified value α can be set as a suitable, design value, but if, for example, a lower limit value for electronic shutter speed TV1 is made 1/16th of a second (TV=4) and an upper limit value for sensitivity SV1 is made ISO 1600 (VS.=9), the specified value α=4−9=−5. If the difference between shutter speed and sensitivity is smaller than the threshold value α, that is, if the subject light amount is slightly dark, the image processing circuit 227 is set to black and white mode (S353), and the original process flow is returned to. If TV1−SV1 is larger than the specified value α in step S351, the subject light amount is sufficiently bright, and so the color mode setting of the image processing circuit 227 is kept as it is and not changed, and the original process flow is returned to.

Returning to step S349, if black and white mode is currently set, processing advances to step S355 and it is determined whether or not $TV1-SV1<\alpha+\Delta\alpha.\Delta\alpha$ can also be set to a suitable design value, but is preferably a value larger than 0.5 and smaller than 1.5 such that switching between black and white and color does not occur frequently, and an image is easy to see. If the result of determination in step S355 is that $TV1-SV1$ is smaller than $\alpha+\Delta\alpha$, the subject light amount is low, and so black and white mode is maintained and the original process flow is returned to directly. On the other hand, if $TV1-SV1$ is larger than $\alpha+\Delta\alpha$, the black and white mode is released (S355), color mode is set in the image processing circuit 227, and the original process flow is returned to.

Next, "live view condition setting 2" will be described. If the setting 2 subroutine is entered, first of all a difference $\Delta EV$ between target image brightness (specified value) and image brightness at the time of the previous exposure is calculated (S343). Then the electronic shutter speed TV1 and sensitivity SV1 for the next exposure are determined (S345) so that image brightness is constant. This determination is obtained from the following elements:

Aperture value at time of previous exposure AV0
currently set aperture value AV1
Electronic shutter speed TV0 for previous exposure
Sensitivity SV0 for previous exposure
Difference $\Delta EV$ between target image brightness and brightness value for previous exposure First, as a basic equation for exposure conditions, there is:

$$AV0+TV0=BV0+SV0$$

Here, BV0 is the previous brightness, but an actual value is not known and with the above equation is made a virtual value. The real brightness value BV0 is off from the target by a difference, namely by $\Delta EV$, and so $$BV0 = AV0 + TV0 - SV0 + \Delta EV,$$
$$= AV1 + TV1 - SV1$$

and from this relationship TV1 and SV1 are obtained. Here, difference $\Delta EV$ can be obtained, for example, from a difference between weighted average of output of each pixel of the image sensor and a value that is made the target. If step S345 is completed, processing advances to previously described step S347, and after specified steps have been executed the original process flow is returned to.

In this live view condition setting subroutine, in the event that subject light amount is low, black and white mode is set, and so it is possible to reduce noise and roughness noise in the monitor image even when it is dark. Also, since there is a hysteresis characteristic at the time of switching between black and white and color, there is no rapid switching between black and white and color and the image becomes easy to see. Determination as to whether or not black and white mode is to be entered, and whether or not black and white mode is to be released is carried out in this embodiment based on a difference between electronic shutter speed TV1 and sensitivity SV1, but it is also possible for both to be based on the same data. For example, whether or not to enter black and white mode can be determined based on a value of TV−SV, and whether or not to release based on the SV value, or when entering black and white mode basing determination on only the TV value and release on the SV value.

Also, with this embodiment, there is switching between color mode and black and white mode, but this is not limiting, and it goes without saying that sepia tone can be used instead of black and white, and display can be made in other monochromatic representations. Further, instead of monochrome mode, it is possible to carry saturation in color mode. For example, when using 8-bit color representation, in the event that subject brightness is dark it is possible to lower saturation by reducing color representation to 4-bits etc. to reduce flickering in the live view display.

With the digital single lens reflex camera of this embodiment, when the lens barrel 10 is removed the shutter 213 that is in front of the image sensor, and movable mirror 201, are returned to a position covering the image sensor (CCD 221), which makes it possible to provide a digital single lens reflex camera capable of live view display and that makes it difficult for dust to become attached to the surface of the image sensor. Also, when the lens barrel is removed, B mode display is stopped and so a warning can be issued to the photographer. The present invention is not limited to a digital single lens reflex camera, and can also be applied to any interchangeable lens type digital camera.

What is claimed is:

1. A digital camera for which a photographing lens can be changed, comprising:
   an imaging section, including an image sensor for capturing a subject image via the photographing lens;
   a display section capable of displaying at least one of image information and character information;
   a shielding section capable of being moved into and out of an imaging light path in order to cover an imaging surface of the image sensor, the shielding section including a movable mirror capable of being moved into and out of the imaging light path of the imaging section and a shutter mechanism capable of shielding the imaging surface of the image sensor;
   a detection section for detecting an operation to remove the photographing lens; and
   a control section for, after the shielding section has been moved out of the imaging light path, causing execution of an exposure operation for a specified period in the imaging section, and causing display of a moving image on the display section based on image data acquired by the exposure operation, the control section executing, when it is detected by the detection section that an operation to remove the photographing lens has been carried out during display of a moving image on the display section based on the image data, at least the following three operations sequentially to:
   stop the imagining operation;
   control the shielding section to cause the shutter mechanism to shield the imaging surface of the image sensor, and the movable mirror to be moved into the imaging light path; and
   cause display of photographing information of the camera instead of the moving image display on the display section.

2. The digital camera of claim 1, wherein the control section controls the imaging section to stop the imaging operation for a specified period when an operation to remove the photographing lens is performed.

3. The digital camera of claim 1, wherein the photographing information of the camera includes at least exposure mode.

4. The digital camera of claim 1, wherein the photographing information of the camera includes at least shutter speed.

5. The digital camera of claim 1, wherein the photographing information of the camera includes at least aperture setting.

6. The digital camera of claim 1, wherein the photographing information of the camera includes at least autofocus mode.

7. The digital camera of claim 1, wherein the photographing information of the camera includes at least flash setting.

8. A control method for digital camera for which a photographing lens can be changed, comprising:

moving a movable mirror, that is arranged in an imaging light path, out of the imaging light path;

releasing a shutter, that is arranged on the front surface of an image sensor, to form a subject image on the image sensor;

capturing the subject images for a specified period using the image sensor, and displaying the images as a moving image on a display device;

detecting whether or not an operation to remove the photographing lens has been carried out during display of the moving image;

causing, when an operation to remove the photographing lens is detected as a result of the detection, the moving image on the display device to be stopped;

causing, after stopping the moving image, the shutter to be closed, and the movable mirror to be moved into the imaging light path, and covering the image sensor with the movable mirror and the shutter; and performing, after covering the image sensor with the movable mirror and the shutter, display in a different form to the moving image display.

9. The control method for digital camera of claim 8, wherein power supply to the image sensor is stopped after the image sensor has been covered with the movable mirror and the shutter and before display in a different form to the moving image display is performed.

* * * * *